3,631,171
CERTAIN 2-AMINO-4,5-DIHYDRO-6H-PYRROLO
[3,2-e]BENZOTHIAZOLES
William Alan Remers, Suffern, N.Y., and Martin Joseph
Weiss, Oradell, N.J., assignors to American Cyanamid
Company, Stamford, Conn.
No Drawing. Filed Jan. 6, 1970, Ser. No. 1,040
Int. Cl. C07d 99/06
U.S. Cl. 260—268 TR                 10 Claims

ABSTRACT OF THE DISCLOSURE

This disclosure describes compounds of the class of 2-substituted-4,5-dihydro-6H-pyrrolo[3,2-e]benzothiazoles useful as antifungal agents.

BRIEF SUMMARY OF THE INVENTION

This invention relates to new organic compounds and, more particularly, is concerned with novel 2-substituted-4,5-dihydro - 6H - pyrrolo[3,2-e]benzothiazoles and with methods of preparing these compounds. The novel compounds of the present invention may be represented by the following general formula:

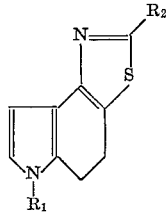

wherein $R_1$ is hydrogen or benzoyl and $R_2$ is amino, mono(lower alkyl)amino, mono(lower alkenyl)amino, di(lower alkyl)amino or 4-(lower alkyl)-1-piperazino. Suitable lower alkyl groups contemplated by the present invention are those having up to four carbon atoms such as, for example, methyl, ethyl, isopropyl, tert-butyl, etc. Suitable lower alkenyl groups are those having from three to six carbon atoms such as, for example, allyl, 2-butenyl, 3-butenyl, dimethallyl, and the like. Suitable 4-(lower alkyl)-1-piperazino moieties contemplated by the present invention are, for example, 4-methyl-1-piperazino, 4-isopropyl-1-piperazino, and the like.

DETAILED DESCRIPTION OF THE INVENTION

The novel compounds of the present invention form nontoxic acid-addition salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, citric, lactic, malic, succinic, tartaric, acetic, benzoic, gluconic, ascorbic, and related acids. For purposes of this invention, the free bases are equivalent to their non-toxic acid-addition salts.

The novel compounds of the present invention are generally obtainable as white to yellow crystalline materials having characteristic melting points and absorption spectra and which may be purified by recrystallization from common organic solvents such as lower alkanols. They are appreciably soluble in many organic solvents such as dimethylformamide, acetone, chloroform, and the like but are sparingly soluble in water. The acid-addition salts of the organic free bases of this invention are, in general, crystalline solids relatively soluble in water, methanol and ethanol but relatively insoluble in non-polar organic solvents such as diethyl ether, benzene, toluene, and the like.

The novel 2-substituted-4,5-dihydro-6H-pyrrolo[3,2-e]-benzothiazoles of the present invention may be readily prepared from 1-benzoyl-5-bromo-4-oxo-4,5,6,7-tetrahydroindole upon treatment with thiourea or an appropriately N-substituted thiourea as illustrated in the following reaction scheme:

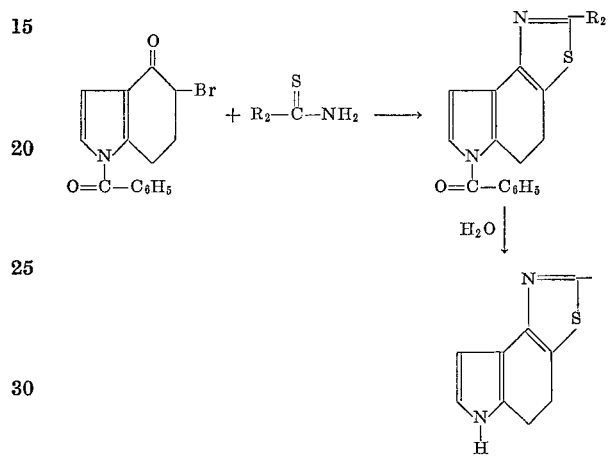

wherein $R_2$ is as hereinabove defined. The reaction is best carried out in tetrahydrofuran as solvent at the reflux temperature for a period of time of from about 3 hours to 15 hours or more. The product crystallizes from the reaction mixture, usually after concentration to a small volume. Removal of the 1-benzoyl group is accomplished by treatment with at least one stoichiometric equivalent of an alkali metal hydroxide such as sodium hydroxide or potassium hydroxide. This reaction is best carried out in aqueous methanol as solvent at room temperature for a period of time of about 15 minutes to an hour or more. The product is removed from the reaction mixture by filtration, usually without the necessity of concentration to a small volume.

The novel compounds of the present invention are useful as antifungal agents and possess broad-spectrum antifungal activity in vitro against a variety of standard laboratory micro-organisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of fungal growth is noted. The minimal inhibitory concentration (expressed in micrograms per milliliter) is defined as the concentration of test compound causing complete inhibition of growth of any particular organism.

The standard laboratory microorganisms employed in the above-described assay were the following:

(1) *Microsporum canis* ATCC 10214
(2) *Microsporum gypseum* ATCC 14683
(3) *Trichophyton tonsurans* NIH 662
(4) *Trichophyton mentagrophytes* (E 11)
(5) *Trichophyton rubrum* (E 97)

In a representative operation, and merely by way of illustration, the minimal inhibitory concentration of typical compounds of this invention against the above test organisms as determined in the above-described assay are set forth in Table I below:

TABLE I
In Vitro Antifungal Activities Minimal Inhibitory Conc. (mcg./ml.)

| Compound | Fungi | | | | |
| --- | --- | --- | --- | --- | --- |
| | (1) | (2) | (3) | (4) | (5) |
| 2-dimethylamino-4,5-dihydro-6H-pyrrolo[3,2-e]benzothiazole | 25 | 100 | 100 | 50 | 100 |
| 2-(4-methyl-1-piperazino)-4,5-dihydro-6H-pyrrolo[3,2-e]benzothiazole | 25 | 100 | 100 | 50 | 50 |
| 6-benzoyl-2-amino-4,5-dihydro-6H-pyrrolo[3,2-e]benzothiazole | 16 | 62 | 16 | 16 | 16 |
| 6-benzoyl-2-methylamino-4,5-dihydro-6H-pyrrolo[3,2-e]benzothiazole | 62 | 250 | 250 | 250 | 250 |
| 6-benzoyl-2-allylamino-4,5-dihydro-6H-pyrrolo[3,2-e]benzothiazole | 62 | 250 | 250 | 250 | 250 |
| 6-benzoyl-2-dimethylamino-4,5-dihydro-6H-pyrrolo[3,2-e]benzothiazole | 250 | | 250 | 250 | 250 |
| 6-benzoyl-2-(4-methyl-1-piperazino)-4,5-dihydro-6H-pyrrolo[3,2-e]benzothiazole | 25 | 25 | 25 | 25 | 25 |

As antifungals, the compounds of this invention may be administered orally or parenterally in the usual pharmaceutical forms, or possibly in the diet, and/or as compositions of active ingredient in an edible carrier. Such compositions may include tablets, scored or unscored, or hard or soft shell capsules. Excipients may include lactose, starch, buffers, disintegrating agents, lubricants, homogenizing agents, and the like. Oral and parenteral compositions may include similar agents and also preservatives, emulsifiers, surfactants, stabilizers, and the like in solutions, suspensions, syrups, elixirs, etc. in either aqueous or non-aqueous systems. Additional excipients might include sweeteners, flavorings, colorings, or perfumes. Topical preparations, it is expected, will prove particularly useful. Such compositions would be designed for administration to subjects exposed to, or infected with sensitive fungi for either treatment or prophylaxis and may include, in addition to the foregoing, ointments, creams, emulsions, unguents, salves, emolients, sprays, washes or the like. In addition, compounds of this invention may be used in the form of solutions, suspensions, emulsions, washes, powders, dusts, mists, soaps, sprays, aerosols, drenches, or other forms for the purpoe of cleaning, disinfecting, or sterilizing surgical instruments, laboratory glassware or instruments, hospital walls or other surfaces, linens, dishes, laboratory tables, coops, cages, or the like. Likewise these compounds might be incorporated into soaps, detergents, sprays or the like in the home, farm, office or elsewhere with the purpose of preventing or minimizing infection or contamination with sensitive fungi. Painting, spraying, immersion or other means of effecting contact may be appiled.

The invention will be described in greater detail in conjunction with the following specific examples.

EXAMPLE 1

Preparation of 1-benzoyl-4-oxo-4,5,6,7-tetrahydroindole

A mixture of 13.5 g. of 4-oxo-4,5,6,7-tetrahydroindole [Ann. Chem. 655, 20 (1962)], 11.2 g. of sublimed potassium tert-butoxide and 200 ml. of benzene is stirred at reflux temperature for one hour, cooled, and treated with a solution of 14.06 g. of benzoyl chloride in 25 ml. of benzene. The resulting mixture is stirred for 2 hours and then treated with 200 ml. of water and 150 ml. of methylene chloride. The organic layer is washed with 5% sodium bicarbonate solution, dried, and concentrated. Recrystallization of the residue from acetone-hexane gives 15.0 g. of product as colorless prisms, M.P. 122°–124° C.

EXAMPLE 2

Preparation of 1-benzoyl-5-bromo-4-oxo-4,5,6,7-tetrahydroindole

A solution of 11.95 g. of 1-benzoyl-4-oxo-4,5,6,7-tetrahydroindole in 150 ml. of tetrahydrofuran is treated portionwise with a solution of 16.0 g. of pyridinium bromide perbromide in 50 ml. of tetrahydrofuran. After 2 hours the resulting mixture is filtered and the filtrate is concentrated under reduced pressure. The residue is dissolved in methylene chloride and washed with 5% sodium bicarbonate solution. Concentration of the organic layer affords the product as a crystalline solid, which after washing with ether, and two recrystallizations from tetrahydrofuran-hexane has melting point 148°–149° C.

EXAMPLE 3

Preparation of 6-benzoyl-2-dimethylamino-4,5-dihydro-6H-pyrrolo[3,2-e]benzothiazole A mixture of 5.0 g. of 1-benzoyl-5-bromo-4-oxo-4,5,6,7-tetrahydroindole, 1.64 g. of 1,1-dimethylthiourea, 2 ml. of triethylamine and 100 ml. of tetrahydrofuran is heated at reflux temperature for three hours and then concentrated to a small volume. The product (3.8 g.) which crystallizes from this concentrate has M.P. 117°–120° C. after two recrystallizations from methanol.

EXAMPLE 4

Preparation of 6-benzoyl-2-diethylamino-4,5-dihydro-6H-pyrrolo[3,2-e]benzothiazole By replacing the 1,1-dimethylthiourea employed in Example 3 with an equimolecular quantity of 1,1-diethylthiourea and following substantially the same procedure described in Example 3, there is obtained the 6-benzoyl-2 - diethylamino - 4,5 - dihydro-6H-pyrrolo[3,2-e]benzothiazole.

EXAMPLE 5

Preparation of 6-benzoyl-2-methylisopropylamino-4,5-dihydro-6H-pyrrolo[3,2-e]benzothiazole The procedure of Example 3 is repeated, substituting an equimolar amount of 1-methyl-1-isopropylthiourea for the 1,1-dimethylthiourea employed in that example. There is thus obtained the 6-benzoyl-2-methylisopropylamino-4,5-dihydro-6H-pyrrolo[3,2-e]benzothiazole.

EXAMPLE 6

Preparation of 6-benzoyl-2-amino-4,5-dihydro-6H-pyrrolo[3,2-e]benzothiazole

This compound is prepared by the method described in Example 3. From 6.36 g. of 1-benzoyl-5-bromo-4-oxo-4,5,6,7-tetrahydroindole and 1.52 g. of thiourea is obtained 4.58 g. of the desired product as yellow crystals which have M.P. 190°–193° C. after recrystallization from methanol.

EXAMPLE 7

Preparation of 6-benzoyl-2-methylamino-4,5-dihydro-6H-pyrrolo[3,2-e]benzothiazole This compound is prepared by the method described in Example 3. From 6.36 g. of 1-benzoyl-5-bromo-4-oxo-4,5,6,7-tetrahydroindole and 1.80 g. of N-methylthiourea is obtained 5.76 g. of the desired product as yellow crystals which have M.P. 171°–174° C. after two recrystallizations from methanol.

EXAMPLE 8

Preparation of 6-benzoyl-2-ethylamino-4,5-dihydro-6H-pyrrolo[3,2-e]benzothiazole Following the general procedure of Example 3, 1-benzoyl-5-bromo-4-oxo-4,5,6,7-tetrahydroindole is treated with N-ethylthiourea to give the 6-benzoyl-2-ethylamino-4,5-dihydro-6H-pyrrolo[3,2-e]benzothiazole.

EXAMPLE 9

Preparation of 6-benzoyl-2-n-propylamino-4,5-dihydro-6H-pyrrolo[3,2-e]benzothiazole Following the general procedure of Example 3, 1-benzoyl-5-bromo-4-oxo-4,5,6,7-tetrahydroindole is treated with N-n-propylthiourea to give the 6-benzoyl-2-n-propylamino-4,5-dihydro-6H-pyrrolo[3,2-e]benzothiazole.

EXAMPLE 10

Preparation of 6-benzoyl-2-n-butylamino-4,5-dihydro-6H-pyrrolo[3,2-e]benzothiazole Following the general procedure of Example 3, 1-benzoyl-5-bromo-4-oxo-4,5,6,7-tetrahydroindole is treated with N-n-butylthiourea to give the 6-benzoyl-2-n-butylamino-4,5-dihydro-6H-pyrrolo[3,2-e]benzothiazole.

EXAMPLE 11

Preparation of 6-benzoyl-2-allylamino-4,5-dihydro-6H-pyrrolo[3,2-e]benzothiazole This compound is prepared by the method described in Example 3. From 6.36 g. of 1-benzoyl-5-bromo-4-oxo-4,5,6,7-tetrahydroindole and 2.32 g. of N-allylthiourea is obtained 6.41 g. of the desired product as yellow crystals which have M.P. 138°–141° C. after recrystallization from diethyl ether.

EXAMPLE 12

Preparation of 6-benzoyl-2-crotylamino-4,5-dihydro-6H-pyrrolo[3,2-e]benzothiazole By replacing the 1,1-dimethylthiourea employed in Example 3 with an equimolecular quantity of N-crotylthiourea and following substantially the same procedure described in Example 3, there is obtained the 6-benzoyl-2-crotylamino-4,5-dihydro-6H-pyrrolo[3,2-e]benzothiazole.

EXAMPLE 13

Preparation of 6-benzoyl-2-dimethallylamino-4,5-dihydro-6H-pyrrolo[3,2-e]benzothiazole The procedure of Example 3 is repeated, substituting an equimolar amount of N-dimethallylthiourea for the 1,1-dimethylthiourea employed in that example. There is thus obtained the 6-benzoyl-2-dimethallylamino-4,5-dihydro-6H-pyrrolo[3,2-e]benzothiazole.

EXAMPLE 14

Preparation of 4-methyl-1-piperazinothiocarboxamide

A suspension of 19.6 g. of potassium thiocyanate in 120 ml. of acetone is treated dropwise with 28.2 g. of benzoyl chloride. The mixture is stirred at reflux for 10 minutes, cooled, and treated gradually with a solution of 20.0 g. of 1-methylpiperazine in 60 ml. of acetone. The resulting thick suspension is stirred at reflux for 1 hour. It is then diluted with 600 ml. of water. The precipitate (34.9 g.) is washed with water and dried in air. A 10.0 g. portion of this solid is heated with 100 ml. of 6 N hydrochloric acid at steam-bath temperature for 30 minutes. The benzoic acid that form is removed by filtration and the filtrate is chilled in ice and basified to pH 12 with 10 N sodium hydroxide. Part of the desired product crystallizes. It is collected and washed with water. The combined filtrate and washes are extracted with chloroform. Concentration of this extract affords additional product (total yield 4.5 g.). Recrystallization from tetrahydrofuran-hexane gives colorless crystals, melting point 171°–173° C.

EXAMPLE 15

Preparation of 4-ethyl-1-piperazinothiocarboxamide

In place of the 1-methylpiperazine of Example 14, there is employed an equimolecular quantity of 1-ethylpiperazine whereby the 4-ethyl-1-piperazinothiocarboxamide is obtained in equally good yield.

EXAMPLE 16

Preparation of 6-benzoyl-2-(4-methyl-1-piperazinyl)-4,5-dihydro-6H-pyrrolo[3,2-e]benzothiazole hydrobromide A mixture of 3.18 g. of 1-benzoyl-5-bromo-4-oxo-4,5,6,7-tetrahydroindole, 1.59 g. of 4-methyl-1-piperazinothiocarboxamide, and 25 ml. of tetrahydrofuran is warmed on a steam bath for 20 hours. It is then filtered and the yellow crystalline product is washed well with tetrahydrofuran and dried in air. Recrystallization from methanol gives the desired product as yellow granular crystals, melting point 255°–257° C.

EXAMPLE 17

Preparation of 6-benzoyl-2-(4-ethyl-1-piperazinyl)-4,5-dihydro-6H-pyrrolo[3,2-e]benzothiazole hydrobromide Following the general procedure of Example 16, 1-benzoyl-5-bromo-4-oxo-4,5,6,7-tetrahydroindole is treated with 4-ethyl-1-piperazinothiocarboxamide to give the 6-benzoyl-2-(4-ethyl-1-piperazinyl)-4,5-dihydro-6H-pyrrolo[3,2-e]benzothiazole hydrobromide.

EXAMPLE 18

Preparation of 2-dimethylamino-4,5-dihydro-6H-pyrrolo[3,2-e]benzothiazole

A suspension of 3.8 g. of 6-benzoyl-2-dimethylamino-4,5-dihydro-6H-pyrrolo[3,2-e]benzothiazole in 75 ml. of methanol is treated with 2.35 ml. of 5 N sodium hydroxide. The mixture is stirred 15 minutes and then filtered. The crystalline product (2.15 g.) has M.P. 246°–248° C. after recrystallization from methanol. Treatment of this product with hydrogen chloride affords the hydrochloride salt as a hydrate which decomposes above 205° C.

EXAMPLES 19–28

Preparation of 2-substituted-4,5-dihydro-6H-pyrrolo[3,2-e]benzothiazoles

In the manner described in Example 18, the compounds of Table II are obtained.

TABLE II

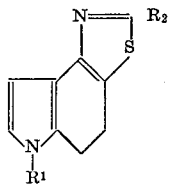

| Example No. | Starting material | Product R₁ | Product R₂ |
|---|---|---|---|
| 19 | 6-benzoyl-2-diethylamino-4,5-dihydro-6H-pyrrolo[3,2-e]benzothiazole | H | $N(C_2H_5)_2$ |
| 20 | 6-benzoyl-2-methylisopropylamino-4,5-dihydro-6H-pyrrolo[3,2-e]benzothiazole | H | $N\begin{array}{c}CH_3\\CH-CH_3\\ \|\\CH_3\end{array}$ |
| 21 | 6-benzoyl-2-amino-4,5-dihydro-6H-pyrrolo[3,2-e]benzothiazole | H | $NH_2$ |
| 22 | 6-benzoyl-2-methylamino-4,5-dihydro-6H-pyrrolo[3,2-e]benzothiazole | H | $NHCH_3$ |
| 23 | 6-benzoyl-2-ethylamino-4,5-dihydro-6H-pyrrolo[3,2-e]benzothiazole | H | $NHC_2H_5$ |
| 24 | 6-benzoyl-2-n-propylamino-4,5-dihydro-6H-pyrrolo[3,2-e]benzothiazole | H | $NHCH_2CH_2CH_3$ |
| 25 | 6-benzoyl-2-n-butylamino-4,5-dihydro-6H-pyrrolo[3,2-e]benzothiazole | H | $NH(CH_2)_3CH_3$ |
| 26 | 6-benzoyl-2-allylamino-4,5-dihydro-6H-pyrrolo[3,2-e]benzothiazole | H | $NHCH_2CH=CH_2$ |
| 27 | 6-benzoyl-2-crotylamino-4,5-dihydro-6H-pyrrolo[3,2-e]benzothiazole | H | $NHCH_2CH=CHCH_3$ |
| 28 | 6-benzoyl-2-dimethallylamino-4,5-dihydro-6H-pyrrolo[3,2-e]benzothiazole | H | $NHCH_2CH=C\begin{array}{c}CH_3\\CH_3\end{array}$ |

EXAMPLE 29

Preparation of 2-(4-methyl-1-piperazinyl)-4,5-dihydro-6H-pyrrolo[3,2-e]benzothiazole This compound is prepared by the method described in Example 18, except that an additional equivalent of sodium hydroxide is added. From 1.84 g. of 6-benzoyl-2-(4-methyl-1-piperazinyl)-4,5-dihydro - 6H - pyrrolo[3,2-e]benzothiazole hydrobromide is obtained 0.81 g. of the desired product as colorless crystals, melting point 189°–195° C. after recrystallization from acetone.

EXAMPLE 30

Preparation of 2-(4-ethyl-1-piperazinyl)4,5-dihydro-6H-pyrrolo[3,2-e]benzothiazole Following the general procedure of Example 29, alkaline hydrolysis of 6-benzoyl-2-(4-ethyl-1-piperazinyl)-4,5 - dihydro-6H-pyrrolo[3,2-e]benzothiazole hydrobromide affords the desired product.

We claim:
1. A compound selected from the group consisting of those of the formula:

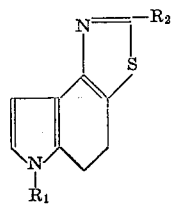

wherein R₁ is selected from the group consisting of hydrogen and benzoyl and R₂ is selected from the group consisting of amino, mono(lower alkyl)amino, di(lower alkyl)amino, mono(lower alkenyl)amino and 4-(lower alkyl)-1-piperazino; and the non-toxic pharmaceutically acceptable acid-addition salts thereof.

2. A compound according to claim 1 wherein R₁ is benzoyl and R₂ is amino.

3. A compound according to claim 1 wherein R₁ is benzoyl and R₂ is methylamino.

4. A compound according to claim 1 wherein R₁ is benzoyl and R₂ is dimethylamino.

5. A compound according to claim 1 wherein R₁ is benzoyl and R₂ is allylamino.

6. A compound according to claim 1 wherein R₁ is benzoyl and R₂ is 4-methyl-1-piperazino.

7. A compound according to claim 1 wherein R₁ is hydrogen and R₂ is amino.

8. A compound according to claim 1 wherein R₁ is hydrogen and R₂ is ethylamino.

9. A compound according to claim 1 wherein R₁ is hydrogen and R₂ is dimethylamino.

10. A compound according to claim 1 wherein R₁ is hydrogen and R₂ is 4-methyl-1-piperazino.

References Cited

UNITED STATES PATENTS 2,891,862    6/1959    Vanallan et al. _____ 260—305

ALEX MAZEL, Primary Examiner

R. J. GALLAGHER, Assistant Examiner

U.S. Cl. X.R.

260—305, 326.16; 424—200, 250, 270